(12) United States Patent
Wu

(10) Patent No.: US 10,563,740 B2
(45) Date of Patent: Feb. 18, 2020

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 289 days.

(21) Appl. No.: 15/629,199

(22) Filed: Jun. 21, 2017

(65) Prior Publication Data

US 2017/0284523 A1 Oct. 5, 2017

Related U.S. Application Data

(63) Continuation of application No. 14/534,281, filed on Nov. 6, 2014, now Pat. No. 9,719,583.

(30) Foreign Application Priority Data

Jul. 21, 2014 (TW) .............................. 103124959 A
Sep. 25, 2014 (TW) .............................. 103133146 A

(51) Int. Cl.
   *F16H 25/20* (2006.01)
(52) U.S. Cl.
   CPC ......... *F16H 25/2025* (2013.01); *F16H 25/20* (2013.01); *F16H 2025/209* (2013.01);
   (Continued)
(58) Field of Classification Search
   CPC ................ F16H 2025/2071; F16H 2025/2031
   See application file for complete search history.

(56) References Cited

U.S. PATENT DOCUMENTS 4,858,491 A * 8/1989 Shube ..................... B64C 13/42
   74/665 B
5,832,779 A * 11/1998 Madrid ................... F16H 25/20
   74/89.39
(Continued)

FOREIGN PATENT DOCUMENTS

CN      2423351 Y    3/2001
CN    203594748 U    5/2014

OTHER PUBLICATIONS

Office Action dated Jul. 10, 2019 of the corresponding China patent application No. 201711092459.9.

Primary Examiner — William Kelleher
Assistant Examiner — Gregory T Prather
(74) Attorney, Agent, or Firm — Chun-Ming Shih; HDLS IPR Services

(57) ABSTRACT

A linear actuator includes a housing, motors, actuator members, clutch members, a base, a clutch driver, and a pulling handle. The motors are disposed in the housing. The actuator members are respectively disposed in the housing and corresponding to a respective one of the motors. Each clutch member is connected between a respective one of the motors and a respective corresponding one of the actuator members. The base is disposed on an outer surface of the housing, a flange is disposed on an outer surface of the base, and a guiding slot is formed on the base. The clutch driver is in the base and connected to each of the clutch members. A cam contacting against the flange is formed on an end of the pulling handle, and a shaft is inserted through the end. The shaft is inserted through the guiding slot to connect the clutch driver.

12 Claims, 13 Drawing Sheets

(52) U.S. Cl.
CPC ............... *F16H 2025/2071* (2013.01); *F16H 2025/2084* (2013.01)

(56) References Cited

U.S. PATENT DOCUMENTS

| | | | | |
|---|---|---|---|---|
| 5,917,696 | A * | 6/1999 | Peng | G06F 1/181 361/679.33 |
| 9,500,265 | B2 * | 11/2016 | Pittini | F16H 19/04 |
| 2005/0269887 | A1 * | 12/2005 | Blanding | B64C 13/00 310/112 |
| 2006/0032785 | A1 * | 2/2006 | Liu | H01L 21/67369 206/710 |
| 2007/0023042 | A1 * | 2/2007 | Lee | A61M 15/0045 128/203.15 |
| 2007/0058377 | A1 * | 3/2007 | Zampini, II | F21V 15/013 362/372 |
| 2008/0073630 | A1 * | 3/2008 | Wu | A47C 19/045 254/1 |
| 2009/0050451 | A1 * | 2/2009 | Sorensen | F16H 25/20 200/61.85 |
| 2009/0120220 | A1 * | 5/2009 | Sorensen | A61G 7/018 74/89.38 |
| 2010/0139427 | A1 * | 6/2010 | Yamaguchi | F16H 1/225 74/89.33 |
| 2010/0236343 | A1 * | 9/2010 | Chiang | F16H 25/20 74/89.34 |
| 2011/0025136 | A1 * | 2/2011 | Chao | H02K 41/03 310/12.02 |
| 2014/0126226 | A1 * | 5/2014 | Wang | F21V 31/005 362/375 |
| 2014/0174225 | A1 * | 6/2014 | Wu | F16H 25/20 74/89.39 |
| 2014/0182405 | A1 * | 7/2014 | Wu | F16H 25/20 74/89.32 |
| 2014/0202271 | A1 * | 7/2014 | Oberndorfer | H02K 7/06 74/89.37 |
| 2015/0040703 | A1 * | 2/2015 | Huang | B23Q 1/30 74/89.33 |
| 2016/0017966 | A1 * | 1/2016 | Wu | F16H 25/20 74/89.38 |
| 2016/0025198 | A1 * | 1/2016 | Chen | F16H 25/20 74/89.33 |
| 2017/0338714 | A1 * | 11/2017 | Jorgensen | F16H 25/20 |

* cited by examiner

LINEAR ACTUATOR

CROSS-REFERENCE TO RELATED APPLICATIONS

This application is a continuation application of U.S. application Ser. No. 14/534,281 filed on Nov. 6, 2014, which claims priority to TW103133146 filed on Sep. 25, 2014 and TW103124959 filed on Jul. 21, 2014. The entire disclosures of the above applications are all incorporated herein by reference.

BACKGROUND

1. Technical Field

The present invention relates to a linear actuator and, in particular, to a linear actuator effecting quick releasement by a clutch member.

2. Related Art

Linear actuators are widely used for closing/opening doors or elevating/lowering hospital beds. The conventional linear actuator usually includes a motor and an actuator block threadedly connected to a screw rod. The actuator block is restricted in a linear track and is linearly movable in the track upon rotation of the screw rod driven by the motor. The actuator block can be connected by a rod to a to-be-pushed object for pushing it.

However, the above-mentioned structure can only move the to-be-pushed object by driving the motor. Therefore, when it is used for elevating/lowering hospital beds, it cannot quickly lower the beds for medical workers to save patients in emergencies.

In view of the foregoing, the inventor made various studies to improve the above-mentioned problems to realize the improvements, on the basis of which the present invention is accomplished.

BRIEF SUMMARY

It is an object of the present invention to provide a linear actuator effecting quick releasement by a clutch member.

Accordingly, the present invention provides a linear actuator which comprises a housing, a plurality of motors disposed in the housing, a plurality of actuator members, a plurality of clutch members, a base, a clutch driver, and a pulling handle. The motors are disposed in the housing. The actuator members are respectively disposed in the housing and corresponding to a respective one of the motors. Each of the clutch members is connected between a respective one of the motors and a respective corresponding one of the actuator members. The base is disposed on an outer surface of the housing. A flange is disposed on an outer surface of the base, and a guiding slot is formed on the base. A clutch driver is disposed in the base and connected to each of the clutch members. A cam in contact against the flange is formed on an end of the pulling handle, and a shaft is inserted through the end. The shaft is inserted through the guiding slot to connect the clutch driver.

It is preferable that each of the clutch members includes a worm gear, a transmitting claw, and a clutch ring. The worm gear is engaged with the motor. A sliding groove is longitudinally formed on a side surface of the worm gear. The transmitting claw is fixedly disposed on the screw rod. A sliding key and a clutch claw are disposed at two sides of an inner edge of the clutch ring, respectively. The clutch ring is disposed outside the worm gear to enclose the same, and the sliding key is engaged into the sliding groove. Thereby, the clutch ring is slidable to make the clutch claw engage or release the transmitting claw.

It is preferable that a connecting base is fixedly disposed in the housing and is fixedly connected to each of the motors. The connecting base is preferably made of metal and bent into shape.

Accordingly, the present invention further provides a linear actuator which comprises a housing, a plurality of motors disposed in the housing, a plurality of actuator members, a plurality of clutch members, a base, a clutch driver, and a pulling handle. A plurality of pivot notches is formed on the housing. A cover plate is disposed at an opening of the pivot notch. The motor is disposed in the housing. The actuator members are disposed in the housing and respectively corresponding to a respective one of the motors. Each of the clutch members is connected between a respective one of the motors and a respective corresponding one of the actuator members. The base is disposed on an outer surface of the housing. A flange is disposed on an outer surface of the base, and a guiding slot is formed on the base. The clutch driver is disposed in the base and connected to each of the clutch members. A cam contacting against the flange is formed on an end of the pulling handle, a shaft is inserted through the end, and the shaft is inserted through the guiding slot to connect the clutch driver. At least one slide fastener, capable of being restored to its initial position, is disposed on the housing to fix the cover plate thereto.

It is preferable that the actuator member comprises a screw rod, an actuator block, and a pushing linkage. The screw rod is axially rotatable, and one end of the screw rod is threadedly connected to the actuator block. The pushing linkage is pivotally disposed in the housing, one end of the pushing linkage protrudes out of the housing, and the other end of the pushing linkage contacts against the actuator block.

The linear actuator is capable of selectively effecting connection or releasement of the motor to the actuator member by means of the clutch member. Therefore, in emergencies, pulling the pulling handle can effect releasement of the clutch member, thereby making the pushing linkage of the actuator member return quickly to lower a work piece rapidly.

DETAILED DESCRIPTION

Figure 1:
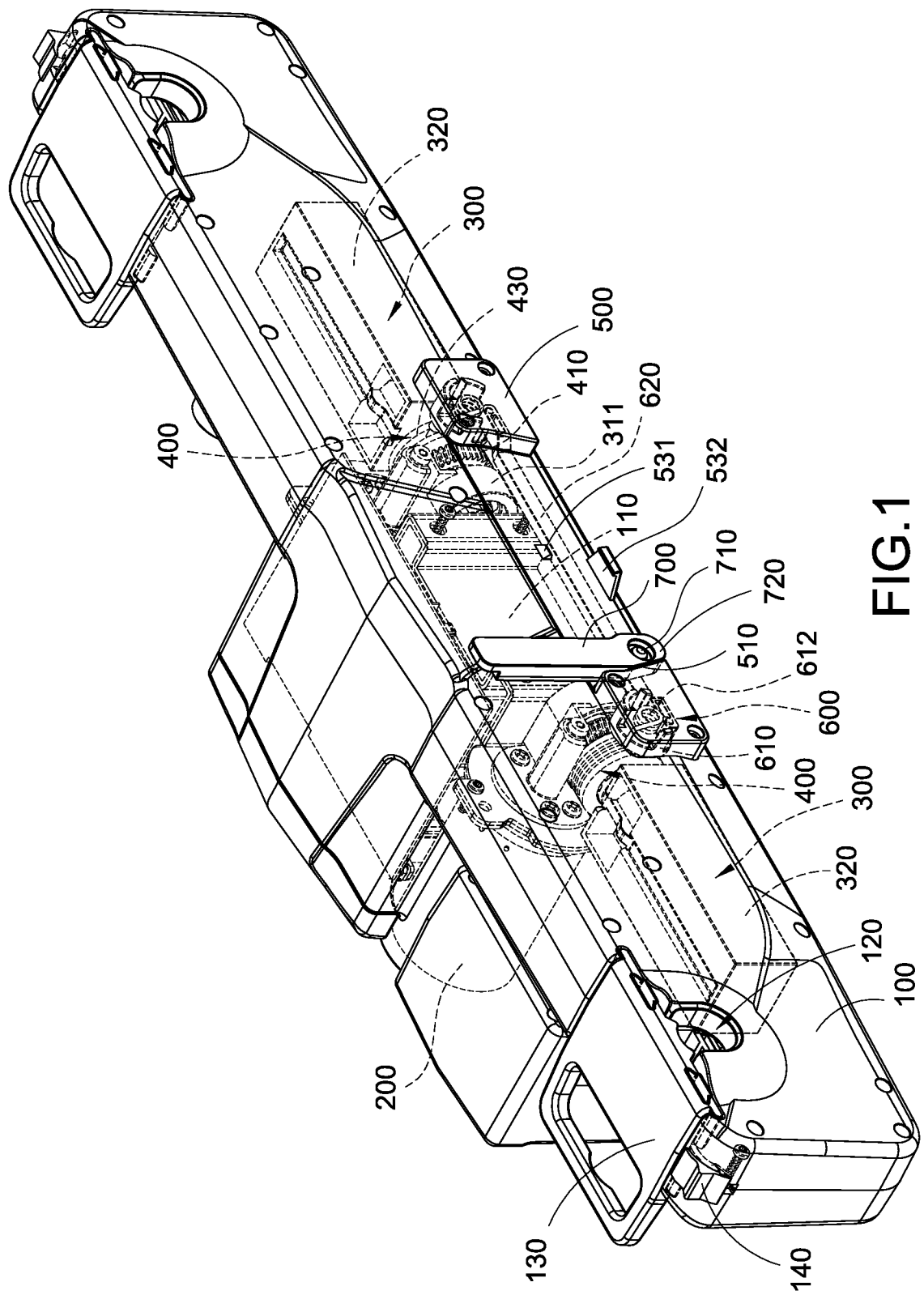
FIG. 1 is a schematic perspective view of a linear actuator according to a preferable embodiment of the present invention.
Figure 2:
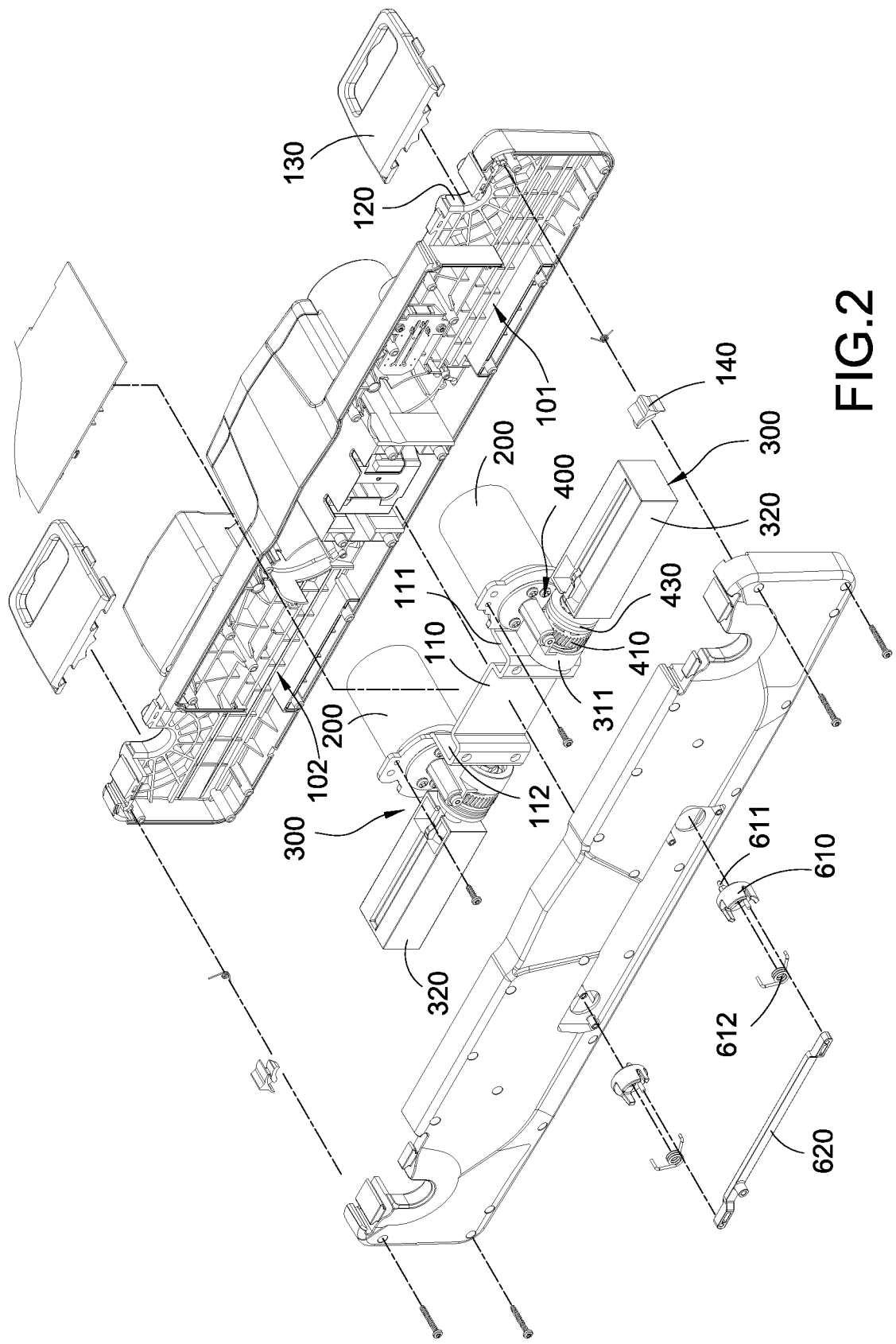
FIG. 2 is a schematic perspective exploded view of the linear actuator according to the preferable embodiment of the present invention.

Referring to FIG. 1 and FIG. 2, a linear actuator is provided according to a preferable embodiment of the present invention, which comprising a housing 100, a plurality of motors 200, a plurality of actuator members 300, a plurality of clutch members 400, a base 500, a clutch driver 600, and a pulling handle 700.

The housing 100 can be hollow and made of metal or plastic; however, the present invention is not limited to the materials or shapes of the housing 100. The housing 100 has a plurality of track trenches 101/102 disposed therein. The track trenches 101/102 are aligned longitudinally and spaced apart in a line. A connecting base 110 is disposed between the track trenches 101 and 102. In the present embodiment, the connecting base 110 is made of metal and bent into shape. Two ends of the connecting base 110 are disposed toward track trenches 101 and track trenches 102, respectively. A middle section of the connecting base 110 is bent, so as to form a pair of vertical faces 111 and 112 vertical to the two ends of the connecting base 110.

The plurality of motors 200 is disposed in the housing 100. In the present embodiment, preferably there are two motors 200 fixed at the two ends of the connecting base 110, respectively, and the two motors 200 are arranged spaced apart and parallel to each other.

Figure 3:
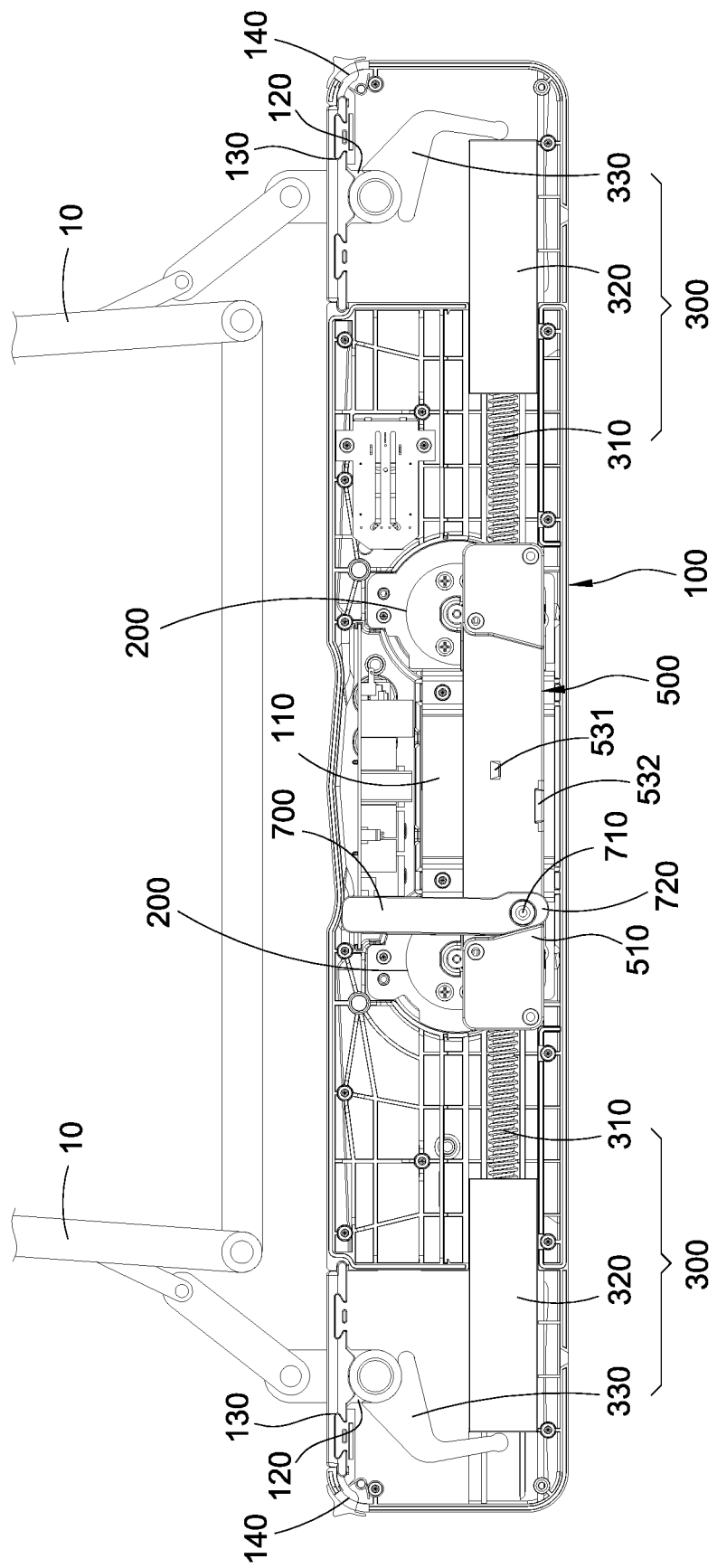
FIG. 3 is a cross-sectional view of the linear actuator according to the preferable embodiment of the present invention.
Figure 4:
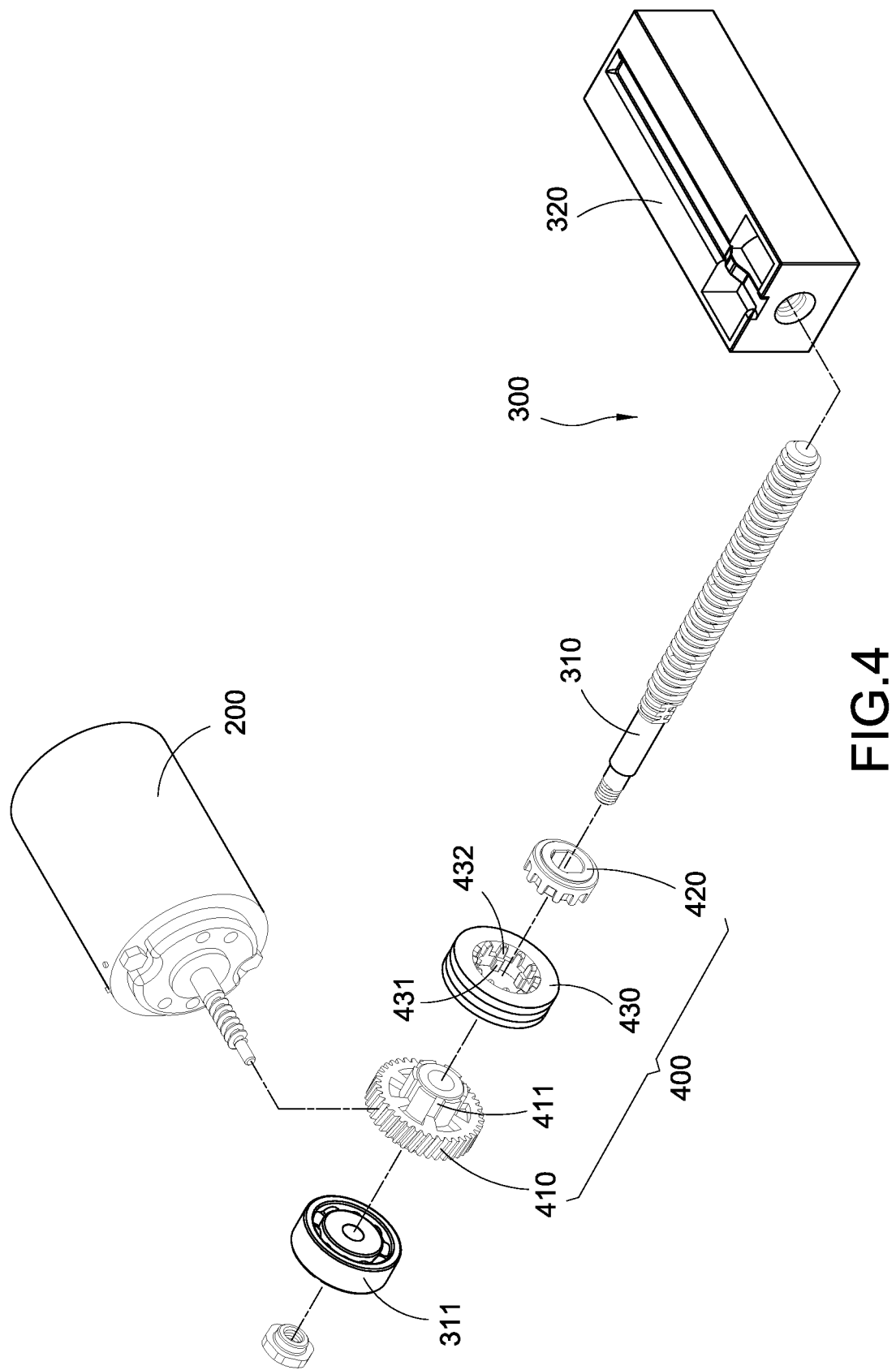
FIG. 4 is a schematic perspective exploded view of a clutch member of the linear actuator according to the preferable embodiment of the present invention.

Referring to FIGS. 2 to 4, the plurality of actuator members 300 are disposed in the housing 100, and each of the actuator members 300 is disposed corresponding to a respective one of the motors 200. In the present embodiment, each of the actuator members 300 includes a screw rod 310 and an actuator block 320, and a pushing linkage 330. One end of the screw rod 310 is pivotally disposed in a vertical manner on the vertical faces 111 and 112, and the end is enclosed in a bearing 311 so as to be axially rotatable. The screw rod 310 is vertical to the corresponding motor 200. The other end of the screw rod 310 is threadedly connected to the actuator block 320. Each of the actuator blocks 320 are respectively contained in the corresponding track trenches 101 and 102. The pushing linkage 330 is pivotally disposed in the housing 100. One end of the pushing linkage 330 protrudes out of the housing 100 to push up a work piece 10 (e.g. a hospital bed), and the other end of the pushing linkage 330 contacts against the actuator block 320.

Each of the clutch members 400 is connected between a respective one of the motors 200 and a respective corresponding one of the actuator members 300. In the present embodiment, each of the clutch members 400 respectively includes a worm gear 410, a transmitting claw 420, and a clutch ring 430. The worm gear 410 is engaged with the motor 200 so as to be driven by the motor 200. At least one sliding groove 411 is longitudinally formed on a side surface of the worm gear 410. The transmitting claw 420 is in a ring shape and fixedly encloses the screw rod 310. At least one sliding key 431 and at least one clutch claw 432 are protrudingly disposed at two sides of an inner edge of the clutch ring 430, respectively. In the present embodiment, a plurality of sliding keys 431 is disposed in correspondence to the sliding grooves 411 on the worm gear 410. The clutch ring 430 is disposed outside the worm gear 410 to enclose the same, each sliding key 431 is engaged into a respective corresponding one of the sliding grooves 411, and thereby the clutch ring 430 is slidable in a longitudinal direction of the worm gear 410 to make the clutch claw 432 engage or release the transmitting claw 420. When the clutch claw 432 of the clutch ring 430 engages the transmitting claw 420, the screw rod 310 is driven to be moved by the motor 200, thereby driving the pushing linkage 330 to support or elevate the work piece 10.

Figure 5:
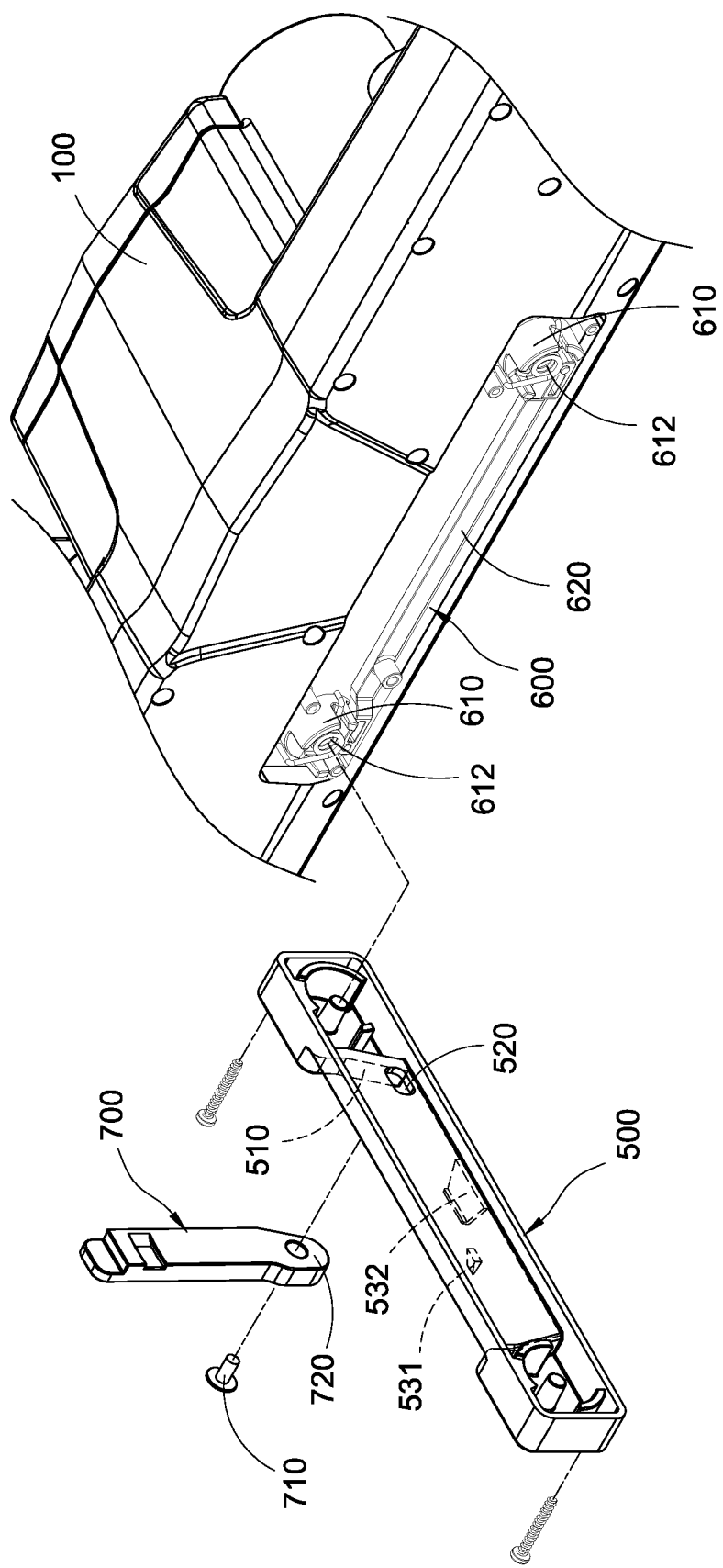
FIG. 5 is a schematic perspective exploded view of a clutch driver of the linear actuator according to the preferable embodiment of the present invention.

Referring to FIGS. 3 and 5, the base 500 is disposed on an outer surface of the housing 100. A flange 510 is disposed on an outer surface of the base 500, and a guiding slot 520 is formed on the base 500. Furthermore, at least one stop 531/532 is protrudingly disposed on the outer surface of the base 500. In the present embodiment, there are two stops 531 and 532.

Figure 6:
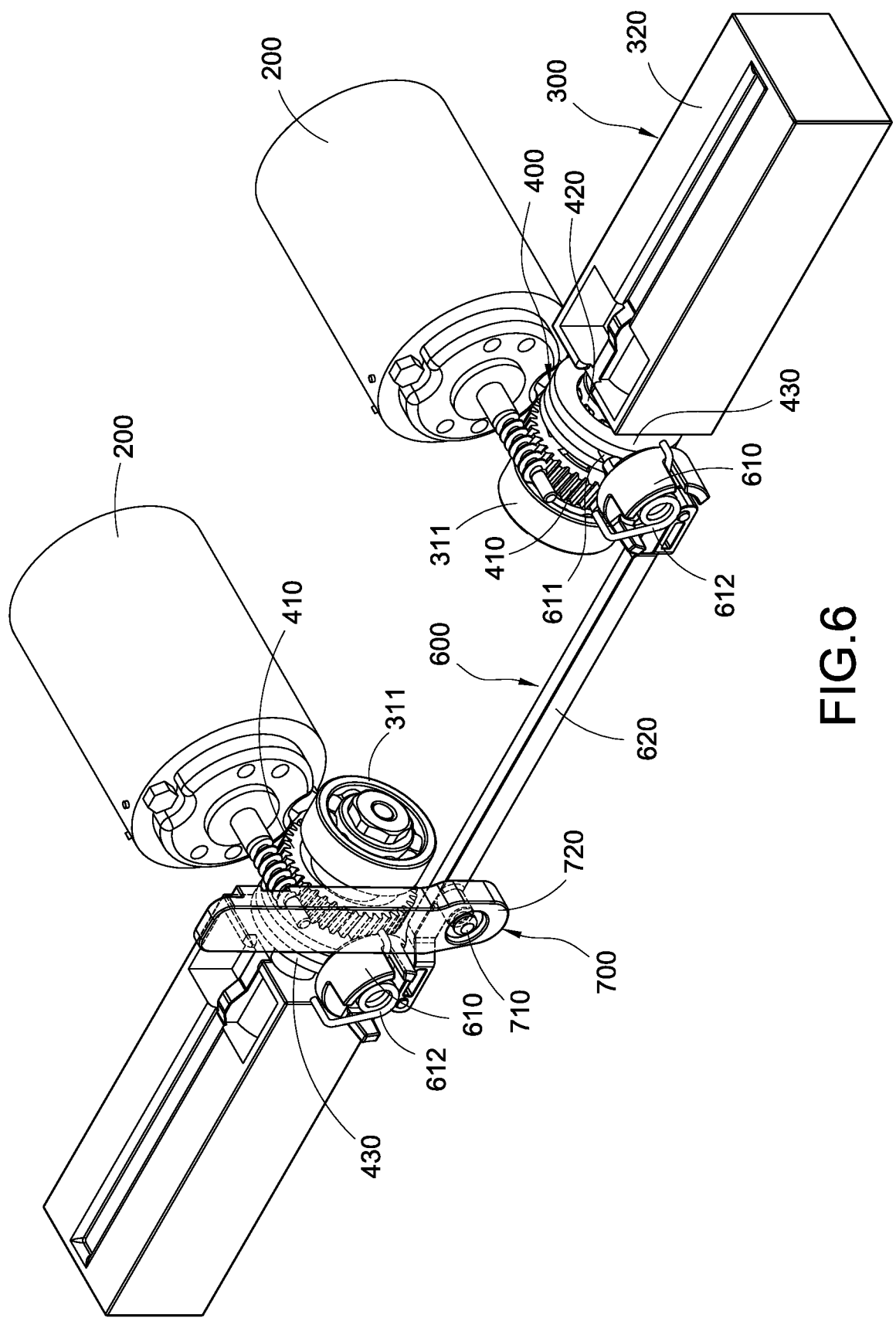
FIG. 6 is a schematic view illustrating a connection structure of components in the linear actuator according to the preferable embodiment of the present invention.
Figure 7:
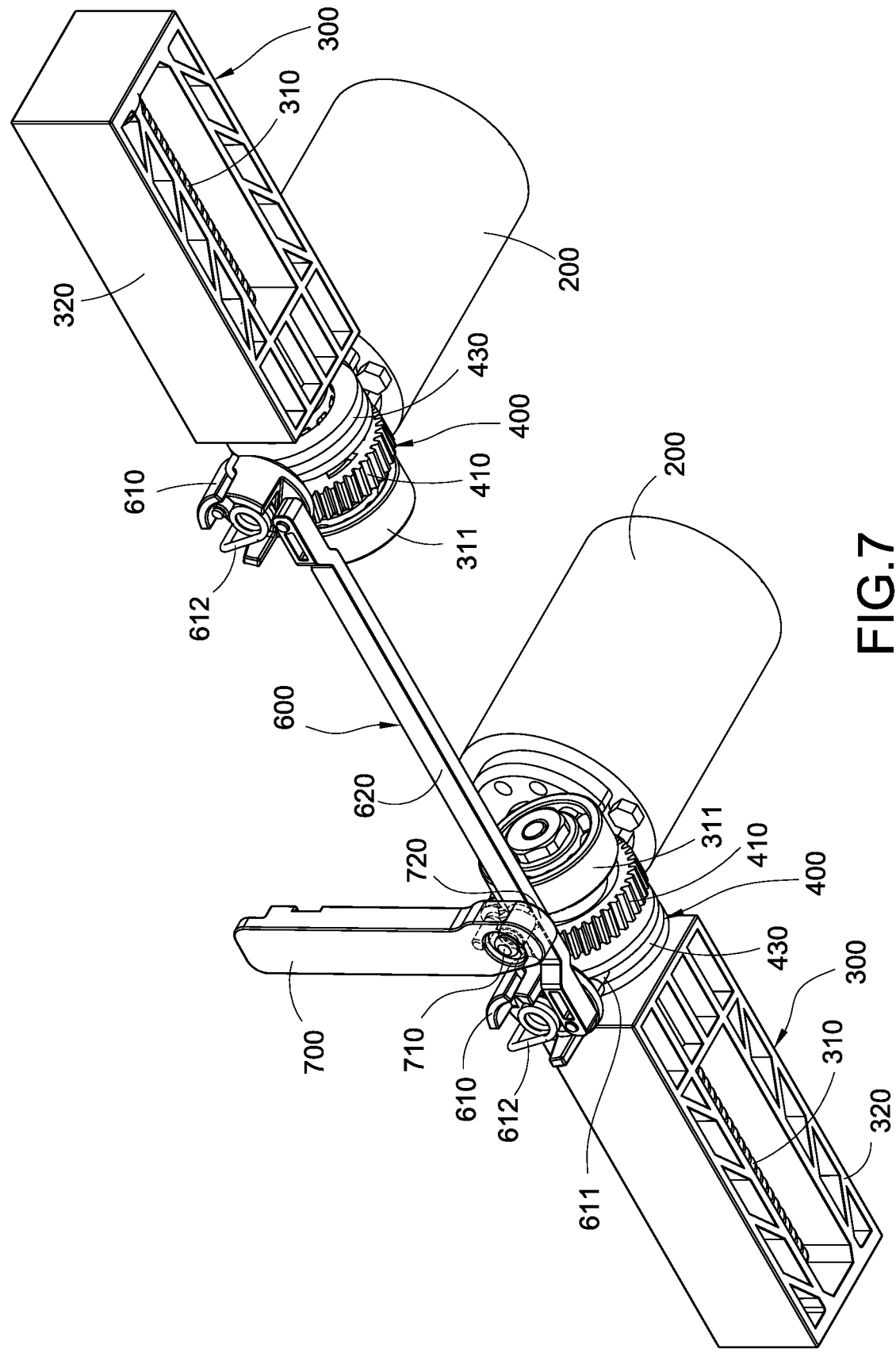
FIG. 7 is another schematic view illustrating the connection structure of the components in the linear actuator according to the preferable embodiment of the present invention.

Referring to FIGS. 5 to 7, the clutch driver 600 is disposed in the base 500 and connected to each of the clutch members 400. In the present embodiment, the clutch member 600 includes a plurality of turning wheels 610 and a connecting rod 620. An eccentric pushing rod 611 is respectively disposed in a protruding manner on each of the turning wheels 610. Each of the eccentric pushing rods 611 is connected to the clutch ring 430 of a respective corresponding one of the clutch members 400. The connecting rod 620 is connected to the shaft 710 and is eccentrically connected to each of the turning wheels 610. Each of the turning wheels 610 has a restoring element 612 respectively disposed thereon. According to the present embodiment, the restoring element 612 is a spring pushing against the turning wheel 610.

Referring to FIG. 1 and FIGS. 5 to 7, the pulling handle 700 is in a long rod shape. A shaft 710 is inserted through one end of the pulling handle 700. The shaft 710 is inserted through the guiding slot 520 to connect the connecting rod 620 of the clutch driver 600. The shaft 710 is movable along the guiding slot 520. A cam 720 is formed on the end of the pulling handle 700. When the other end of the pulling handle 700 is pulled to make the pulling handle 700 rotate about the shaft 710 as an axis, the cam 720 is simultaneously moved to rotate about the shaft 710 as axis. The cam 720 is in contact against the flange 510 on the base 500. When the cam 720 rotates, the cam 720 pushes against the flange 510 to make the shaft 710 move along the guiding slot 520, so that the connecting rod 620 is moved to drive the two turning wheels 610 to rotate. When the turning wheel 610 rotates, the eccentric pushing rod 611 on the turning wheel 610 pushes the connected clutch ring 430 to release the transmitting claw 420.

Figure 8:
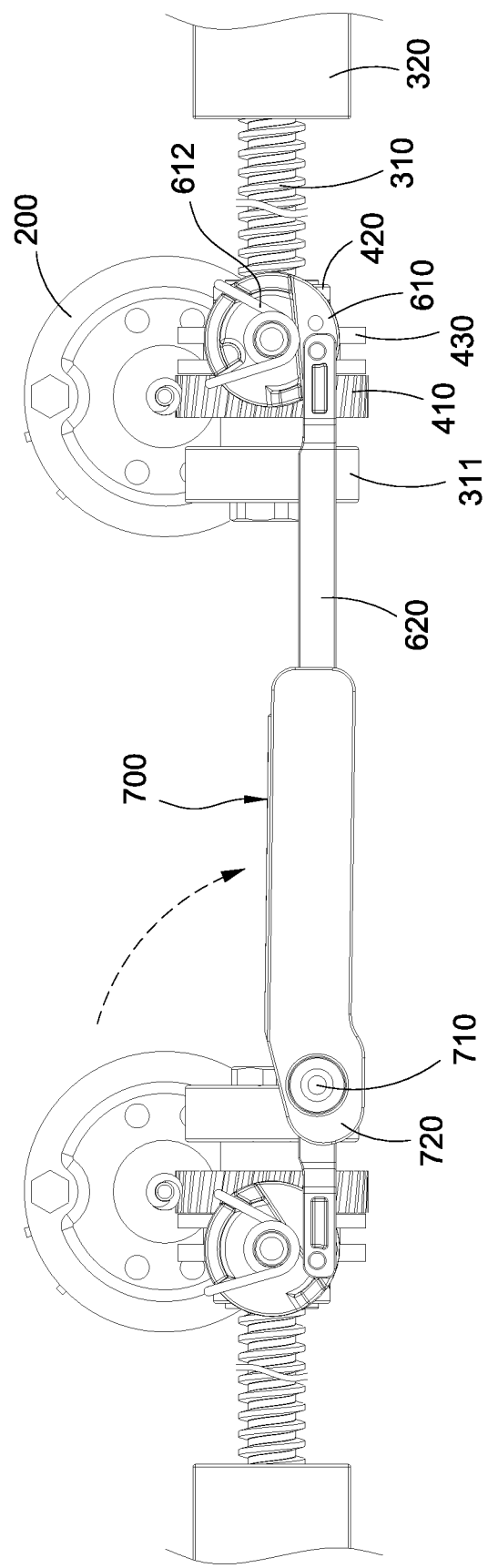
FIG. 8 is a schematic view illustrating releasement of the clutch member of the linear actuator according to the preferable embodiment of the present invention.
Figure 9:
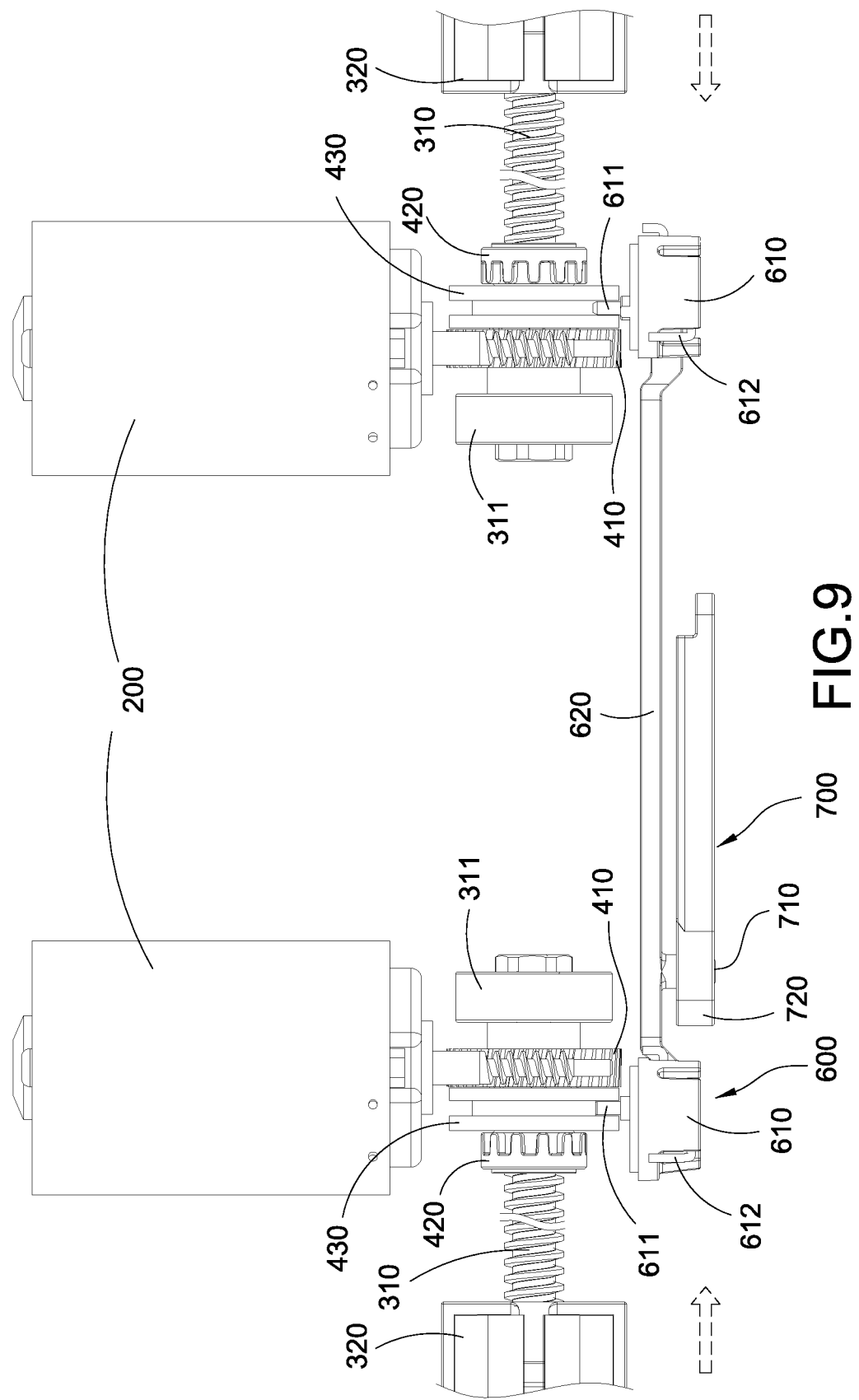
FIG. 9 is another schematic view illustrating releasement of the clutch member of the linear actuator according to the preferable embodiment of the present invention.

Referring to FIGS. 3, 8, and 9, when the pulling handle 700 is pulled to move, it drives the clutch claw 432 to be released from the transmitting claw 420, so that the screw rod 310 is not driven by the motor 200. At this point, the screw rod 310 can rotate freely, and the weight of the work piece 10 is applied to the pushing linkage 330 to push the actuator block 320, so that the screw rod 310 is forced to rotate quickly, and the actuator block 320 moves quickly at the same time. Therefore, by pulling the pulling handle 700 to release the clutch ring 430, the pushing linkage 330 can quickly return, thereby making the work piece 10 lowered quickly. With the aid of the stop 531, the position of the dead center of the pulling handle 700 can be restricted to prevent the pulling handle 700 from being bounced back. With the aid of the other stop 532, the pulling handle 700 is prevented from moving beyond a predetermined pivotal route.

Figure 10:
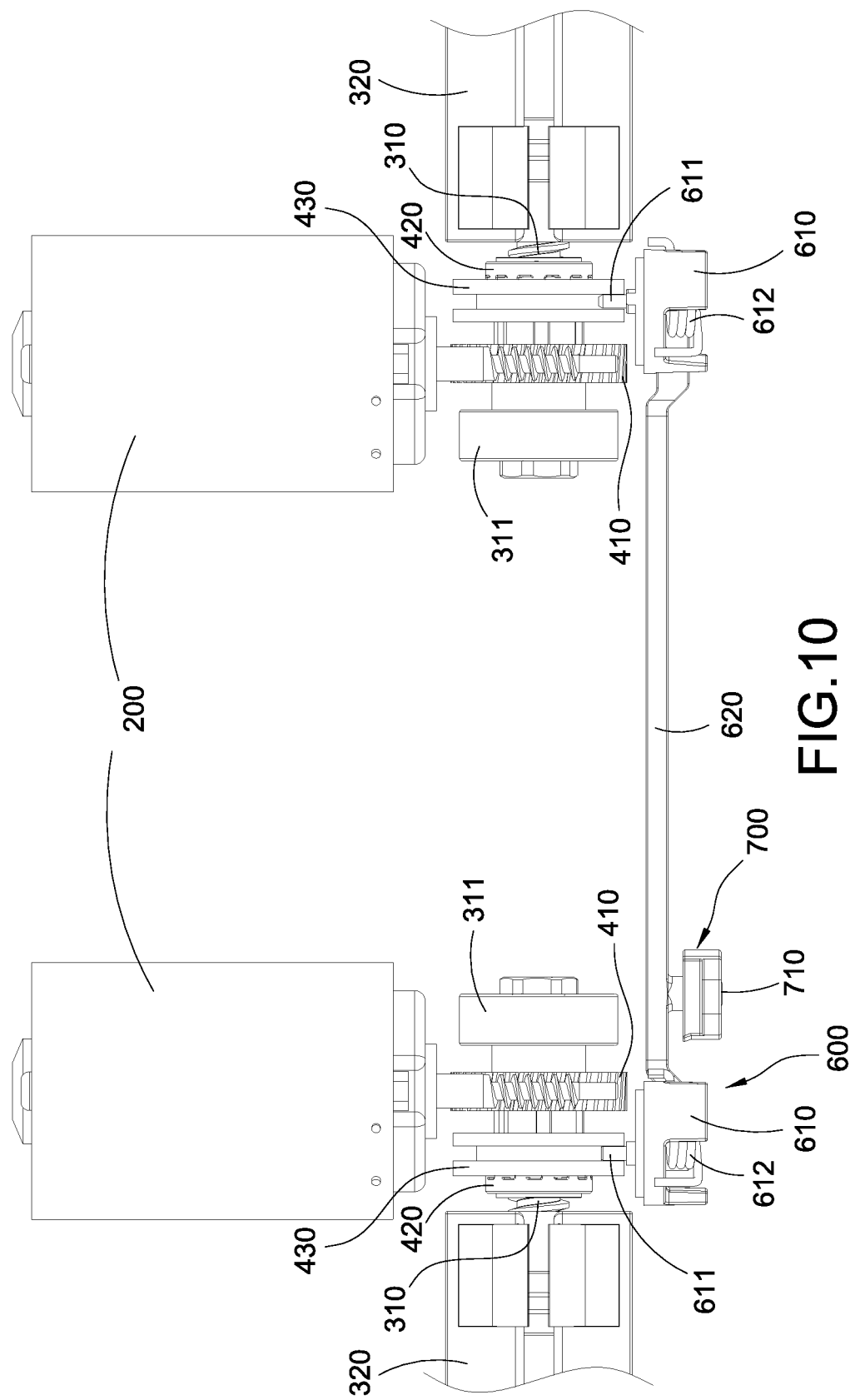
FIG. 10 is a schematic view illustrating how the movement is driven by engagement of the clutch member of the linear actuator according to the preferable embodiment of the present invention.
Figure 11:
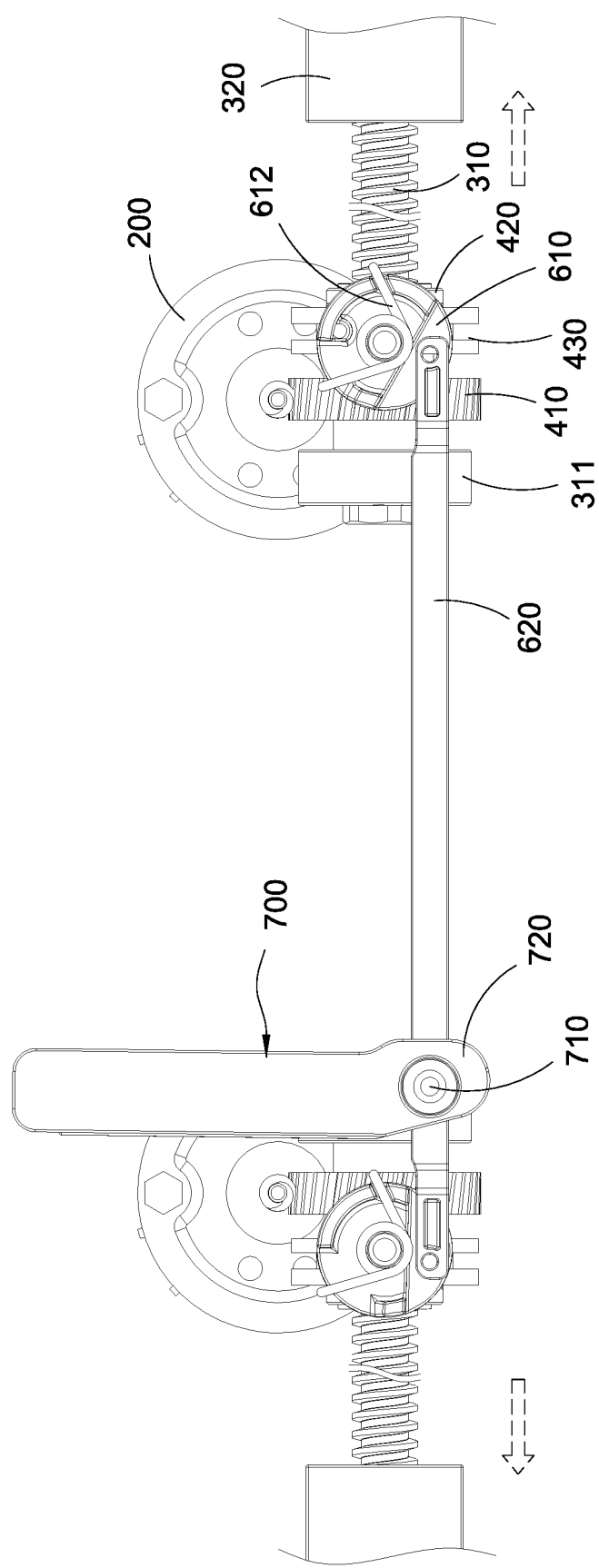
FIG. 11 is another schematic view illustrating how the movement is driven by engagement of the clutch member of the linear actuator according to the preferable embodiment of the present invention.

Referring to FIGS. 3, 10, and 11, when the pulling handle 700 is released, each restoring element 612 pushes each turning wheel 610 to rotate to be restored to its initial position. When the turning wheel 610 rotates to be restored to its initial position, the eccentric pushing rod 611 thereon pushes the connected clutch ring 430 toward the transmitting claw 420, so the clutch claw 432 engages the transmitting claw 420, thereby making the screw rod 310 driven and moved by the motor 200. When the turning wheel 610 is restored to its initial position, the connecting rod 620 also drives the pulling handle 700 to rotate to be restored to its initial position.

Figure 12:
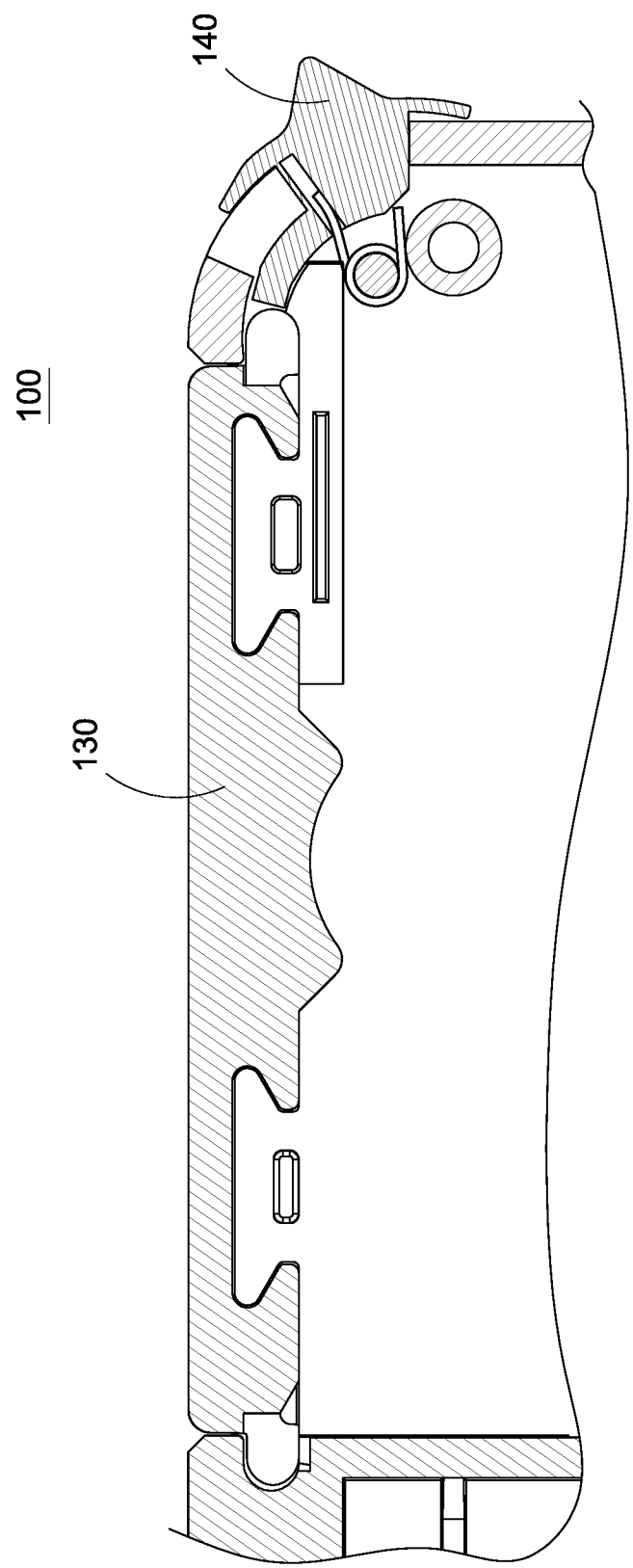
FIG. 12 is a schematic view illustrating a state in which a cover plate of the linear actuator is released according to the preferable embodiment of the present invention.
Figure 13:
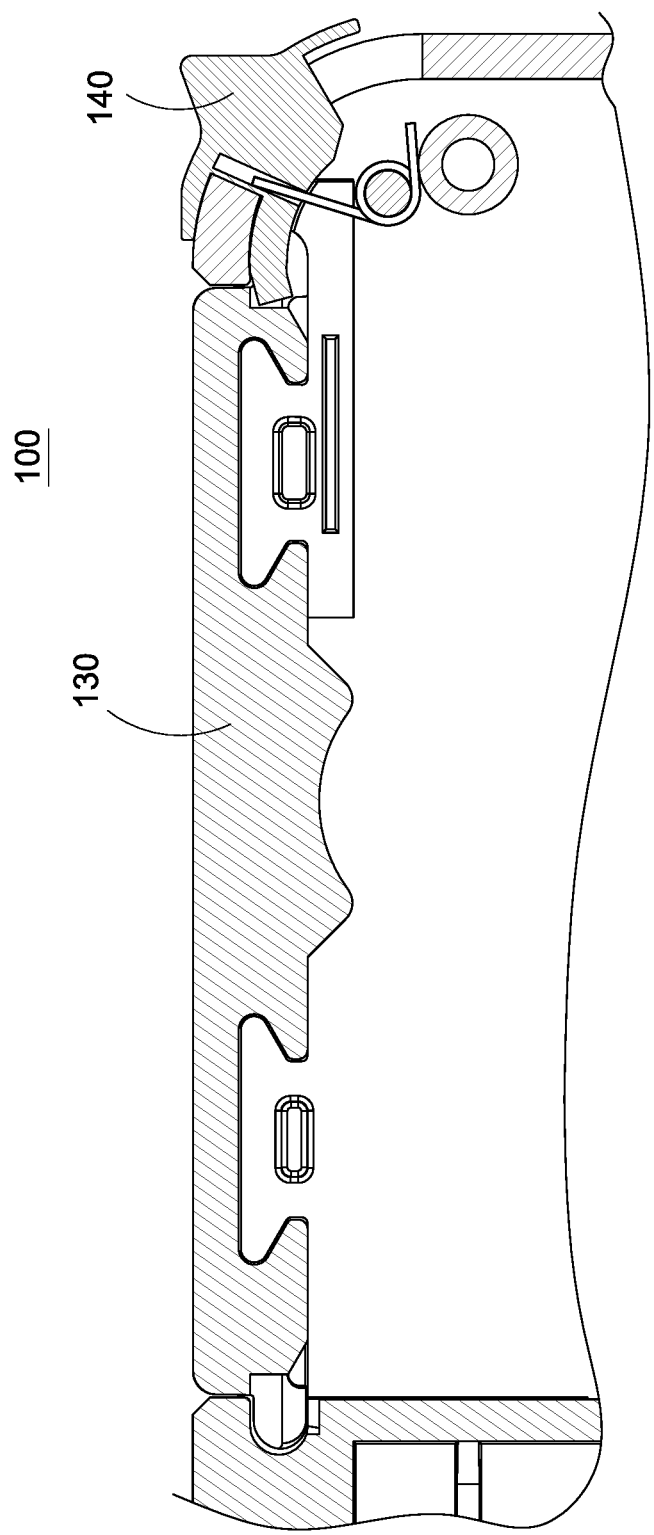
FIG. 13 is a schematic view illustrating a state in which a cover plate of the linear actuator is locked according to the preferable embodiment of the present invention.

Referring to FIGS. 3, 12, and 13, a pair of pivot notches 120 is disposed on the housing 100, and each of the pushing linkages 330 is pivotally disposed on the pair of pivot notches 120. A cover plate 130 is insertedly disposed at an opening of each pivot notch 120 to fix the pushing linkage 330 at the pivot notch 120. A slide fastener 140 capable of being restored to its initial position is respectively disposed at each of the openings to fix the cover plate 130. Therefore, when inserting the cover plate 130 in the housing 100, the slide fastener 140 is pushed away by the cover plate 130. After the cover plate 130 is inserted to be in a fixed position so as to close the pivot notch 120, the slide fastener 140 is restored to its initial position and blocks the cover plate 130. Therefore, the cover plate 130 cannot be removed unless an external force pushes the slide fastener 140 away, thereby preventing the pushing linkage 330 from being detached.

The linear actuator of the present invention is capable of selectively bringing the motor 200 and the actuator member 300 into connection or releasement. In emergencies, pulling the pulling handle 700 can enable releasement of the clutch member 400, thereby making the pushing linkage 330 of the actuator member 300 quickly return, so as to quickly lower the work piece 10.

It is to be understood that the above descriptions are merely preferable embodiment of the present invention and not intended to limit the scope of the present invention. Equivalent changes and modifications made in the spirit of the present invention are regarded as falling within the scope of the present invention.

What is claimed is:

1. A linear actuator, comprising:
   a housing;
   a plurality of motors disposed in the housing;
   a plurality of actuator members disposed in the housing and respectively corresponding to a respective one of the motors;
   a plurality of clutch members, each of the clutch members being connected between a respective one of the motors and a respective corresponding one of the actuator members;
   a base disposed on an outer surface of the housing, a flange being disposed on an outer surface of the base, a guiding slot being formed on the base;
   a clutch driver disposed in the base and connected to each of the clutch members; and
   a pulling handle, a cam contacting against the flange being formed on an end of the pulling handle, a shaft being inserted through the end, the shaft being inserted through the guiding slot to connect the clutch driver;
   wherein a plurality of pivot notches are disposed on the housing, a cover plate is insertedly disposed at the openings of each pivot notch, and each of the openings comprises at least one slide fastener pivotally connected to the housing and capable of being restored to its initial position to fix the cover plate with the housing;
   wherein the slide fastener is pushed away by the cover plate when the cover plate is inserted into the housing, the slide fastener is restored to its initial position and blocks the cover plate after the cover plate is inserted to a fixed position so as to close the pivot notch, and the cover plate thereby cannot be removed unless the slide fastener is pushed away.

2. The linear actuator of claim 1, wherein the clutch driver comprises a plurality of turning wheels, each of the turning wheels is driven to rotate by the pulling handle, an eccentric pushing rod is respectively disposed in a protruding manner on each of the turning wheels, and the eccentric pushing rod is connected to the clutch member.

3. The linear actuator of claim 2, wherein the clutch driver comprises a connecting rod, the connecting rod is connected to the shaft and is eccentrically connected to each of the turning wheels.

4. The linear actuator of claim 2, wherein each of the turning wheels is connected to a restoring element respectively.

5. The linear actuator of claim 1, wherein the actuator member comprises a screw rod and an actuator block, the screw rod is axially rotatable, and one end of the screw rod is threadedly connected to the actuator block.

6. The linear actuator of claim 5, wherein each of the actuator members comprises a pushing linkage, the pushing linkage is disposed in the housing, one end of the pushing linkage protrudes out of the housing, and the other end of the pushing linkage contacts against the actuator block.

7. The linear actuator of claim 1, wherein each of the clutch members comprises a worm gear, a transmitting claw, and a clutch ring; the worm gear is engaged with the motor; a sliding groove is longitudinally formed on a side surface of the worm gear; the transmitting claw is fixedly disposed on the screw rod; at least one sliding key and at least one clutch claw are disposed at two sides of an inner edge of the clutch ring, respectively; the clutch ring is disposed outside the worm gear to enclose the same, and the sliding key is engaged into the sliding groove; and the clutch ring is slidable in a longitudinal direction of the worm gear to make the clutch claw engage or release the transmitting claw.

8. The linear actuator of claim 1, wherein the base further comprises a plurality of stops, the stop blocks the pulling handle to restrict movement of the pulling handle.

9. The linear actuator of claim 1, further comprising a connecting base, the connecting base being fixedly disposed in the housing and being fixedly connected to each of the motors, and the connecting base is made of metal and bent into shape.

10. A linear actuator, comprising:
- a housing, the housing comprising a plurality of pivot notches formed thereon, wherein a cover plate is insertedly disposed at the openings of each pivot notch;
- a plurality of motors disposed in the housing;
- a plurality of actuator members disposed in the housing and respectively corresponding to a respective one of the motors; and
- at least one slide fastener pivotally connected to the housing and capable of being restored to its initial position to fix the cover plate with the housing;
- wherein the slide fastener is pushed away by the cover plate when the cover plate is inserted into the housing, the slide fastener is restored to its initial position and blocks the cover plate after the cover plate is inserted to a fixed position so as to close the pivot notch.

11. The linear actuator of claim 10, wherein the actuator member comprises a screw rod and an actuator block, the screw rod is axially rotatable, and one end of the screw rod is threadedly connected to the actuator block.

12. The linear actuator of claim 11, wherein the actuator member comprises a pushing linkage, the pushing linkage is pivotally disposed in the housing, one end of the pushing linkage protrudes out of the housing, and the other end of the pushing linkage contacts against the actuator block.

* * * * *